United States Patent [19]
Kelley

[11] 3,975,742
[45] Aug. 17, 1976

[54] THERMAL PRINTING-ANTI-STICK MECHANISM

[75] Inventor: Thomas P. Kelley, Cornwells Heights, Pa.

[73] Assignee: Honeywell Inc., Minneapolis, Minn.

[22] Filed: Sept. 25, 1975

[21] Appl. No.: 616,607

[52] U.S. Cl. .......................... 346/76 R; 197/1 R; 219/216
[51] Int. Cl.² .................. G01D 15/10; H05B 1/02
[58] Field of Search............ 346/76 R, 79; 197/1 R; 219/216

[56] References Cited
UNITED STATES PATENTS 3,874,493 4/1975 Boyd ........................ 346/76 R X
3,913,091 10/1975 Aizawa et al. ............. 346/76 R X Primary Examiner—George H. Miller, Jr.
Attorney, Agent, or Firm—Laurence J. Marhoefer; Lockwood D. Burton

[57] ABSTRACT

A thermal recording instrument has an incrementally advanced thermal web. Selectively energized heating elements record alphanumeric information on the web and a logic circuit insures that the web will advance while the elements are energized in order to prevent sticking.

6 Claims, 3 Drawing Figures

THERMAL PRINTING-ANTI-STICK MECHANISM

BACKGROUND OF THE INVENTION

1. Field of the Invention

This invention relates to an improvement in thermal recording instruments of the type in which the trace of an analog signal and alphanumeric information are recorded on an incrementally advanced heat responsive web; and, more particularly, to an improved instrument which overcomes the problem of the printhead sticking to the web.

2. Description of the Prior Art

There are a number of instruments in the prior art which record an analog trace and print alphanumeric information concerning this trace on a thermally responsive web. One such device is disclosed in my copending application entitled "Dwell Interval Printing," Ser. No. 417,625, filed Nov. 20, 1973, now abandoned. In this device, the heat responsive web is moved incrementally by means of a stepper motor and a solenoid actuated printhead is brought into contact with the web when it is stationary in order to print alphanumeric information. While generally satisfactory, this device has inherent limitations associated with the repeated mechanical motion required of the printhead.

In another prior art instrument for thermally recording analog and alphanumeric information, a synchronous or other similar motor drives the heat sensitive web continuously. U.S. Pat. No. 3,754,279 illustrates such a prior art device. Again, while such a device is generally satisfactory, it, too, has limitations. For example, it is difficult and costly to use a synchronous type motor to drive the web in a controlled manner over the very wide speed variations required of such recorders.

One proposal to solve the problems of the prior art devices is to use a stepper motor to drive the web incrementally and leave the printhead in continuous contact with the heat sensitive web. While this proposal overcomes the limitations of the prior art devices, it has not proved satisfactory because the printhead tends to stick to the web causing distortions in the analog trace.

SUMMARY OF THE INVENTION

One object of this invention is to provide a thermal recorder in which the web is driven incrementally past a printhead in continuous contact with the web without the head sticking to the web.

Briefly, this invention contemplates a thermal recorder in which a D.C. stepper motor, in response to advance command pulses, incrementally advances a thermally responsive web past a dot matrix printhead in contact with the web. In printing, selected elements of the printhead are heated for a predetermined interval while the web is stationary. To prevent sticking, a logic circuit anticipates the stepper motor advance pulses and enables the print element heating circuitry only if the web will be in motion before the elements cool.

BRIEF DESCRIPTION OF THE DRAWINGS

A better understanding of the present invention may be had from the following detailed description when read in connection with the accompanying drawings in which.

DETAILED DESCRIPTION

Figure 1:
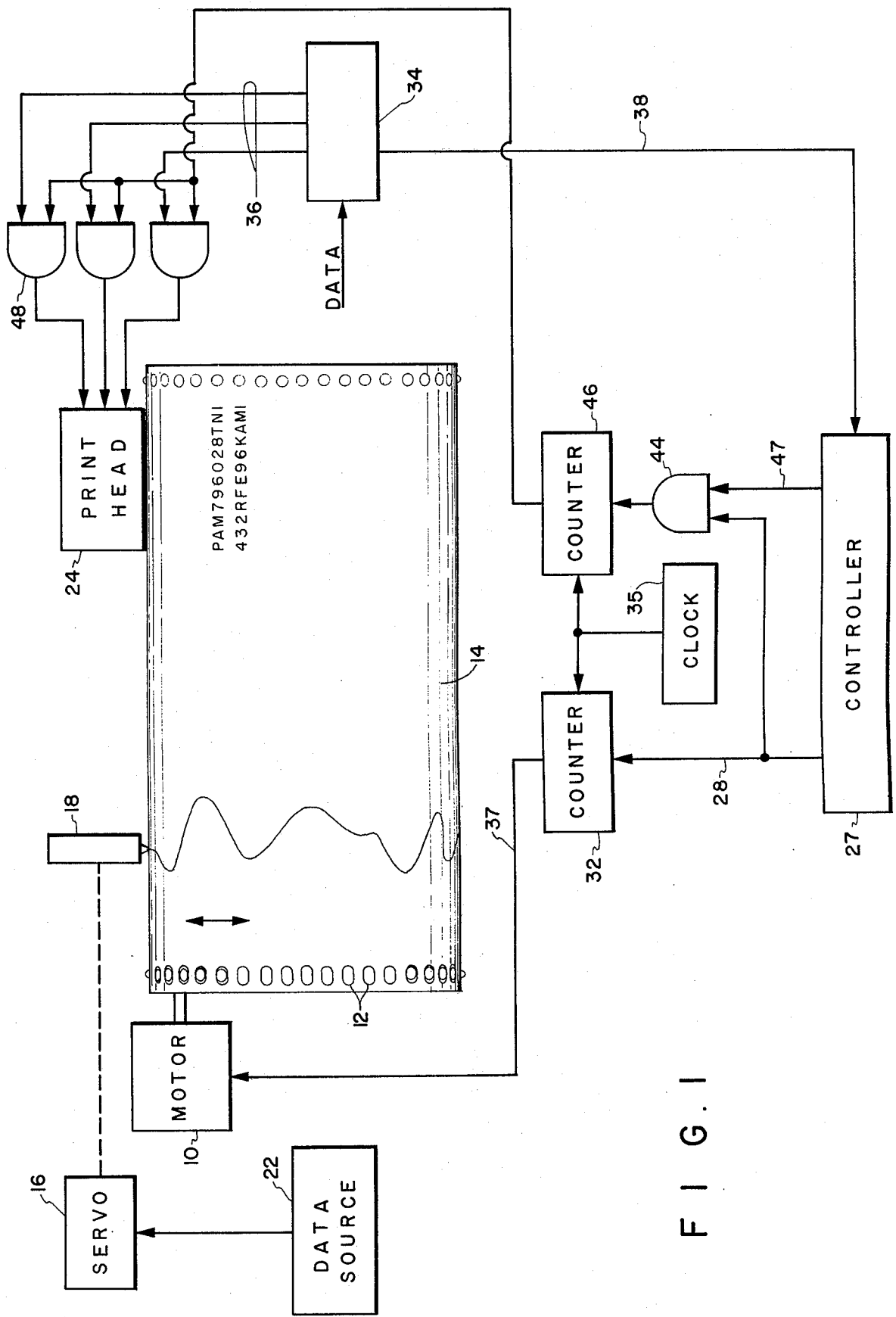
FIG. 1 is partially a schematic and partially a block diagram of one embodiment of the invention.

Referring now to FIG. 1 of the drawings, a stepping motor 10 is mechanically coupled to a drive sprocket (not shown) which engages perforations 12 running along the margin of a heat responsive web. A number of suitable web materials are commercially available; typically, such materials comprise a thermoplastic hydrocarbon layer bonded to a paper sheet.

A mechanical drive 16 of a suitable type known in the prior art, such as a servo-motor slidewire drive, for example, moves an analog recording stylus 18 transversely to the direction of web movement as a function of the magnitude of a signal from a data source 22. The stylus 18 has a heated tip which records the variations in the output signal from source 22 as a displacement from a reference position.

A suitable mechanical bracket (not shown) supports a commercially available printhead 24 in position to print alphanumeric information along the righthand margin of the web 14. The printhead 24 is in continuous contact with the web 14 during the operation of the recorder. In the ordinary uses of a recorder of the type disclosed herein, the alphanumeric information will be related to the analog trace with which it is juxtaposed.

Figure 2:
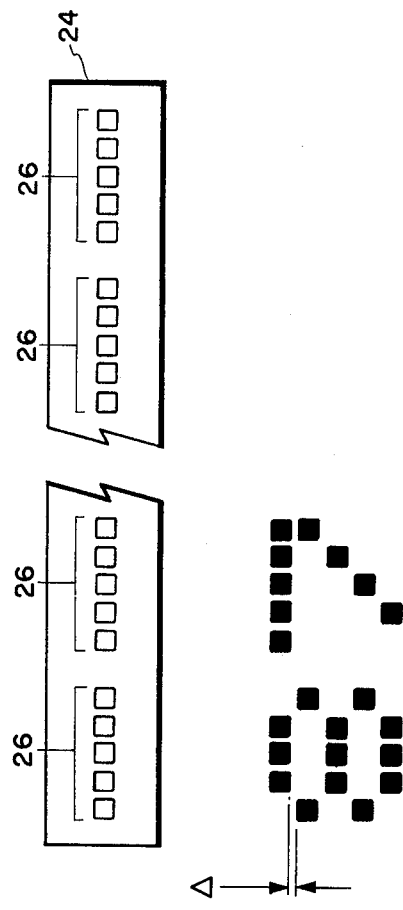
FIG. 2 is a plan view of a printhead and typical characters printed by the head shown on an enlarged scale.

Referring now to FIG. 2 as well as FIG. 1, the printhead 24 is comprised of a row of small heat conducting elements 26. Each of the elements can be selectively heated by an electric current. In this embodiment, there are five elements 26 associated with each column in which information is to be printed. Typically, each character is composed from a 5 × 5 dot matrix pattern. As will be readily apparent to those skilled in the art, characters such as the 8 and 7 shown in FIG. 2 are formed by heating selected ones of the elements 26 to form each row of dots. The web 14 is then advanced a predetermined distance (approximately 4 mils) and the selected heating process is repeated to form the next row and so on until a character is formed. Advantageously, printing takes place in only one or two columns at a time.

A controller 27, which may include a central processing unit, controls the stepping of the motor 10. A lead 28 couples the output of the controller 27 to a digital delay circuit 32 such as, for example, a ringcounter. The delay circuit 32 generates an output on lead 37 for each input pulse after an interval equal in time approximately to the interval for which the elements 26 are energized in order to form a dot. Motor 10 advances one step for each pulse on lead 37. Each step may advance the web a distance equal to the desired interdot spacing of FIG. 2, usually about 16 mils. However, preferably the web is advanced in smaller increments of about 4 mils. In this way, a row of dots for two nonadjacent character positions can be printed; the paper advances slightly and the row for two other character positions is printed. This further reduces sticking. Although there is a slight skew to the line of characters printed in this manner, the skew is not objectionable.

A buffer 34 stores in binary form the pattern of elements to be heated in order to print the desired data characters. Buffer 34 may have an output lead 36 for each of the heater elements 26 in the printhead 24.

(Only three of these output leads have been shown for convenience and clarity.) Alternatively, the outputs of buffer 34 may be multiplexed.

Figure 3:
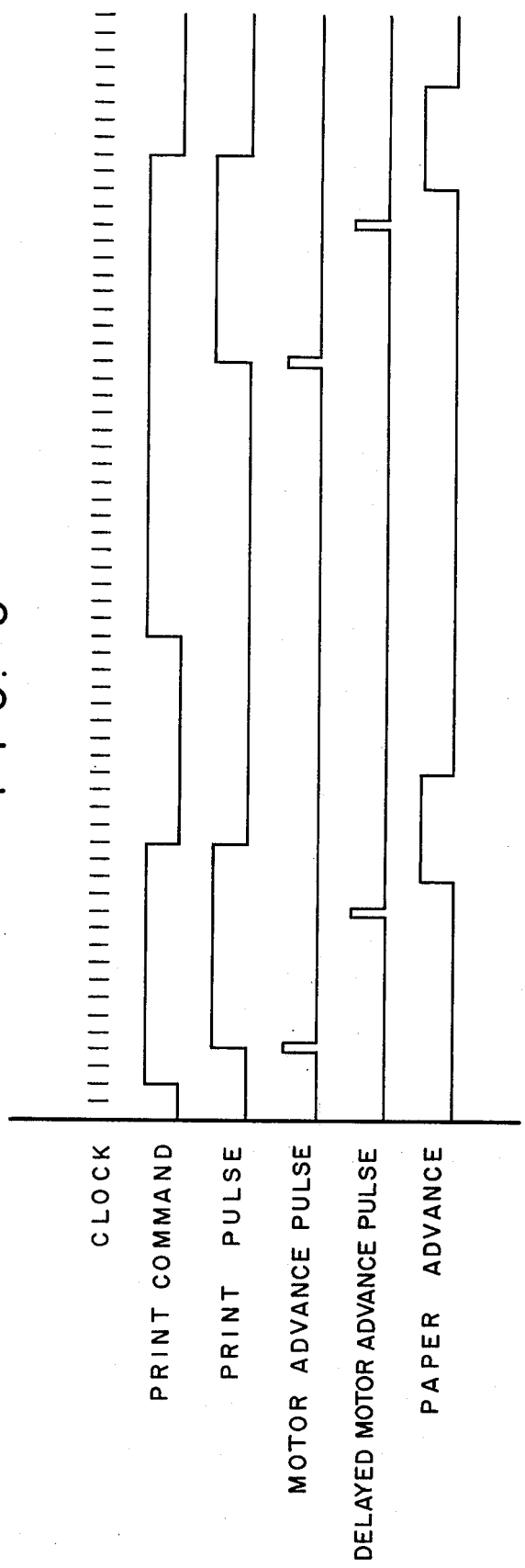
FIG. 3 is a diagram illustrating the interrelation of the embodiment of the invention shown in FIG. 1.

Referring now to FIG. 3 in addition to FIG. 1, in printing a row of dots in a column, controller 27 provides a print command signal on lead 47 as one enabling input to an AND gate 44. The motor advance command pulses from controller 27 provide the other input to gate 44 whose output is coupled to a pulse shaper 46. Pulse shaper 46 may be a single-shot multivibrator, for example, but in a preferred embodiment is a synchronous counter coupled to a clock pulse source 35 which also advances counter 32.

The output of the pulse shaper 46 is the print pulse and is coupled as one input to a series of AND gates 48 whose other inputs are coupled respectively to the output leads 36 of the data buffer 34. When both inputs to any of the gates 48 are true, that gate produces an output signal which causes heating of the respective heating element to which it is connected. The elements remain energized for the duration of the print pulse.

In operation, the controller 27 generates a series of motor advance pulses on lead 28 in accordance with a program as in common prior art recorders. Synchronous counter 32 delays motor advance pulses for a predetermined interval such as, for example, 12 milliseconds in a typical application.

Controller 27 also provides a print command on lead 47 which is coupled as one input to AND gate 44. Gate 44 produces an output pulse only if there will be a motor advance pulse coupled to the motor 10 within the interval established by the delay device 32. It will be noted from FIG. 3 that the duration of the print pulse is an interval longer than the delay established by delay device 32 so that the paper will start advancing before the termination of the print pulse. In this manner, the paper starts moving before the elements 26 cool, thus preventing the elements from sticking to the web, a phenomenon which occurs if the heated element cools while the web is stationary.

Thus, there has been provided, in accordance with the present invention, an improved thermal recording instrument in which the trace of an analog signal and alphanumeric information is recorded on an incrementally advanced heat responsive web and which instrument overcomes the problem of the printhead sticking to the web.

The embodiments of the invention in which an exclusive property or privilege is claimed are defined as follows:

1. A thermal recording instrument comprising in combination:
   a motor for incrementally advancing a thermally responsive web through a predetermined distance in response to a paper advance signal;
   means for generating said paper advance signal;
   a printhead including a plurality of selectively energizable print elements whose temperature rises above ambient temperature when energized;
   means for mounting said printhead so that said printhead is in continuous contact with said web during operation of said instrument;
   means for generating a data signal;
   means for generating an anticipatory signal a predetermined interval prior to the paper advance signal; and
   means responsive to said anticipatory signal and said data signal to selectively energize said elements for a predetermined interval which is sufficient in duration that said web commences advancing before said elements return to ambient temperature.

2. A thermal recording instrument as in claim 1 further including a heated stylus in continuous contact with said web and means for moving said stylus transversely to the direction of movement of said web.

3. A thermal recording instrument as in claim 1 wherein said print elements comprise a linear array of elements respectively capable of producing a single dot on said web when energized.

4. A thermal recording instrument as in claim 2 wherein said print elements comprise a linear array of elements respectively capable of producing a single dot on said web when energized.

5. A thermal recording instrument as in claim 1 wherein said web advance signal commences prior to the predetermined interval for which said elements are heated.

6. A thermal recording instrument as in claim 2 wherein said web advance signal commences prior to the predetermined interval for which said elements are heated.

* * * * *